Sept. 13, 1949.   W. B. HEILMAN ET AL   2,481,591
TREATMENT OF ALUMINOUS DROSS
Filed Sept. 5, 1947
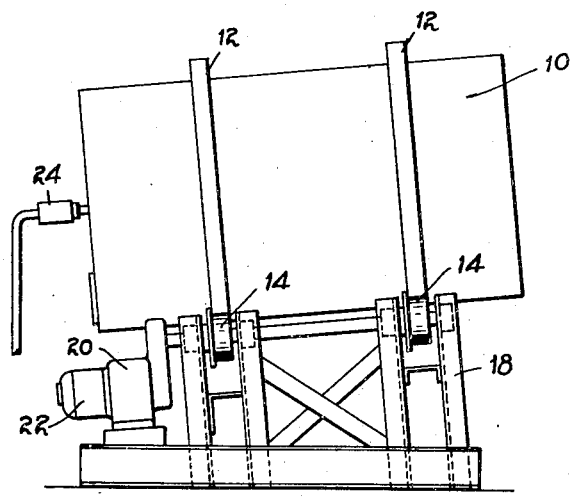
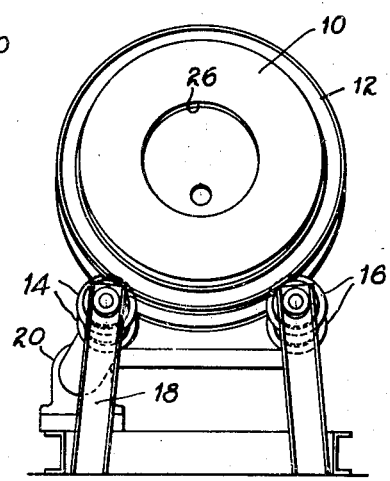
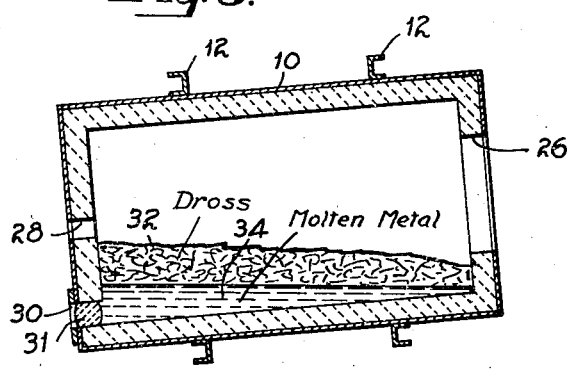
INVENTORS
William B. Heilman and
Herbert M. Short
BY
George B. Todd
ATTORNEY Patented Sept. 13, 1949

2,481,591

UNITED STATES PATENT OFFICE 2,481,591

TREATMENT OF ALUMINOUS DROSS

William B. Heilman, Alcoa, Tenn., and Herbert M. Short, Bridgeville, Pa., assignors to Aluminum Company of America, Pittsburgh, Pa., a corporation of Pennsylvania Application September 5, 1947, Serial No. 772,362

12 Claims. (Cl. 75—24)

This invention relates to the treatment of dross, skimmings and the like derived from the melting of aluminum and aluminum base alloys to reclaim the metal particles entrapped in the dross. These waste materials from melting operations will be referred to herein as aluminous dross to indicate their origin and the nature of the metallic values contained therein.

As is well known, molten aluminum and aluminum base alloys acquire an oxide film on the surface exposed to the air or furnace atmosphere and when a fresh surface is exposed, such as occurs during the stirring of a melt, it also becomes coated with oxide. This film increases in thickness upon continued exposure to the air, especially if the temperature of the metal is raised. In addition to the floating oxide film continuously forming on the melt there is an accumulation on the metal surface of other non-metallic impurities associated with the aluminum, some of which may have been introduced from the initial solid metal charge and others, such as aluminum nitride, that are formed by contact with the air. Thus, during the course of preparing a melt of aluminum, or an alloy thereof, a considerable quantity of oxide, nitride, and other non-metallic impurities, referred to as dross, will gather on the surface of the molten charge. Unless the dross is carefully skimmed off, the metal withdrawn from the furnace will carry dross particles with it which cause undesirable inclusions in the cast and wrought metal products.

As the dross forms, and to some extent as a result of necessary stirring of the melt, particles of the molten metal become entrapped in the dross. The entrapment of some metal is thus unavoidable but the relative amounts of metal occurring in different lots of skimmings will vary depending upon the alloy, the furnace, the melting procedure which has been followed and the care exercised by the furnace operator in raking off the dross. If the amount of entrapped metal is relatively small, say less than 50%, the dross is said to be dry, whereas if this amount is exceeded, the dross is known as the wet variety. At times the material raked from a melting furnace may contain as much as 95% metal. It is obviously very wasteful to discard wet dross while the returns on reclamation of metal from dry dross depend very largely on the cost of processing and handling.

Other metal losses from melting occur than those enumerated, especially the loss resulting from the exothermic reaction commonly referred to as burning. Under conditions of temperature prevailing during the melting operation and in any subsequent holding period, where there is free access to the air, the molten metal globules entrapped in the dross begin to oxidize with the release of a large amount of heat. This creates a condition favorable to the oxidation of other metal globules. The exothermic reaction can thus continue until all or nearly all of the entrapped metal is consumed. Because at least some metal is lost, if not a large part of it, the burning phenomenon has been considered to be undesirable and every effort has been made to cool the dross and skimmings as quickly as possible and thus stop further oxidation.

The problem of separating the metal particles entrapped in the aluminous dross has presented many difficulties. If cold dross is to be processed, it must be crushed and pulverized, as in a ball mill. The metal particles vary greatly in size, and while the larger ones, for example those over 20 mesh size, can be easily removed by screening, a very large proportion of them are of much smaller size and remain in the dross and therefore cannot be advantageously separated therefrom by mechanical means. It is the reclamation of such finely divided particles that has presented special difficulties. Finally, the metal recovered by screening must be remelted before it can be used because of problems associated with melting small particles of metal coated with an oxide.

The difficulties of treating hot or burning dross have been even greater, and though some separation of metallic from non-metallic portions has been effected the metal recovery has been relatively small and highly variable from one batch of dross to another. Moreover, it is quite uncomfortable for any workman to handle the hot material.

Heretofore in treating aluminous dross to recover the metallic values therefrom, it has been a common practice to cool the dross as quickly as possible after allowing any liquid metal accumulating at the bottom of the container to be drained. The cooled dross is then crushed and screened, and the recovered metal is remelted as described above. By the combination of draining, crushing, screening and remelting about half of the entrapped metal may be recovered.

The amount of metal recovered from dross can be increased to some extent by the use of molten salt flux baths which promote coalescense of the metal particles. However, the cost of the flux may not be compensated for by the increased yield of metal.

Attempts to puddle the dross into a molten metal bath or into a fused flux bath have not been productive of high yields. While these methods have been successfully employed in melting aluminous metal scrap they are not designed for recovering metallic values from dross. The customary type of puddling operation in small batches is arduous and therefore metal recovery largely depends upon the efforts of the individual operator. Inasmuch as the dross is an end product of the usual melting operations, it is not economical to attempt puddling it with the molten metal in the melting or holding furnace to reduce the metal content of the dross. Actually, such an operation would introduce more oxide into the metal bath and thus defeat the effort to produce clean metal.

It is a primary object of this invention to provide an improved method for reclaiming the metallic values from aluminous dross. A particular object is to provide a method whereby a consistently higher recovery of metal values is obtained from hot dross than heretofore known. Another object is to provide a process which requires a minimum amount of manual effort and discomfort to operators handling the hot aluminous dross. Still another object is to provide a method of reclaiming metal values from burning aluminous dross which does not require subsequent crushing and screening of the dross residue when cooled to supplement metal recovery. Still another object is to provide a method whereby the natural exothermic reaction occuring in aluminous dross is utilized to increase the recovery of metal from the dross. Another object is to provide a rapid method for treating hot dross whereby the dross from a furnace may be processed and the recovered metal returned to the furnace, thus avoiding contamination from other lots of dross. Other objects of the improved process will be apparent from the following description and claims.

In the annexed drawings illustrated one form of apparatus in which the invention may be carried out, Fig. 1 represents a side elevation, Fig. 2 is an end view of the apparatus shown in Fig. 1 and Fig. 3 is a vertical cross section of the metal container shown in Fig. 1.

We have discovered that consistently higher recoveries of metal from aluminous dross can be obtained by utilizing and controlling the progress of the exothermic reaction to which the dross is susceptible, combined with other features set forth hereinbelow. In particular, we have found that by stimulating the exothermic reaction or promoting its continuance, if already in progress, for a limited period of time under conditions in which the dross is intermingled with any separated molten metal, as by rotation in a suitable receptacle, followed by immediate discharge of the accumulated molten metal, a higher recovery of metal can be obtained than has heretofore been considered possible with the process involving crushing and screening cold dross. Metal recoveries on the order of 70 per cent of the initial metal content have been consistently obtained. The improved process can operate at lower costs than have been possible heretofore in attempting to obtain the same metal recovery, hence, it affords an economic advantage over and above that connected with the increased reclamation of the metallic values of the dross. Furthermore, the process lends itself to the treatment of dross withdrawn from a melting or holding furnace during the melting or holding period and permits the immediate return of recovered molten metal. In this way mixing of various alloys is avoided and no substantial heat is lost by cooling the dross or metal to room temperature and then reheating for subsequent use.

To obtain the increased yield of metal from the aluminous dross it is necessary, as mentioned hereinabove, to maintain the exothermic reaction in the dross for a limited period of time. If the dross is burning upon withdrawal from the furnace, it can be immediately processed for a preselected period of time, or if burning has not started it may be stimulated in a suitable manner such as by addition of a flux, and the reaction allowed to continue for the aforesaid period of time. The metal particles in the dross should be in liquid form to carry out our process. In the absence of any flux, the reaction cannot be started until the temperature of about 850° C. (1562° F.) is reached in the dross. As a general rule, therefore, this is the minimum temperature that can be relied upon for efficient operation of our process under all conditions. Where a flux is employed the reaction can be started at as low a temperature as 660° C. (1220° F.). Under some conditions it is desirable to begin the metal recovery treatment at as low a temperature as possible. After the reaction has started the temperature of the dross rises and may go up to 1260° C. (2300° F.) or higher.

It is important that the reaction be promoted for a brief period, thus rapidly raising the temperature of the dross. Such a quick heating is believed to increase the fluidity of the metal and disrupt the oxide films or barriers between the globules of metal. By promoting the continuance of a vigorous reaction for a short period, a minimum amount of metal is consumed in proportion to the increased recovery which is obtained. In general, the process should be allowed to continue until the dross residue contains less than 30 per cent metal, economic recoveries being obtained within a total period of rotation after the reaction has started of about 1 to 20 minutes, but usually a period of 5 to 10 minutes rotation is sufficient. The length of the period, in any case, will be determined by the amount and character of the dross being processed, the uniformity of burning throughout the mass when introduced to the rotatable container, and the character of the equipment used for conducting the process. Under some conditions it may be desirable to allow the rotation to proceed for a few minutes, usually not more than 10 minutes, then to drain the accumulated metal and again rotate the container. These cycles of rotation and draining may be repeated as long as profitable recovery is obtained but the total rotational time for metal recovery after the reaction has begun should not require more than 20 minutes. Successive cycles may be of equal or unequal length. Such a procedure is especially desirable where the dross initially contains a relatively large amount of metal, and it should be so continued until less than 30 per cent remains in the dross residue if maximum recovery is sought.

Where the reaction is in progress it is possible to add a small amount of cold dross and thus dispose of any accumulation of dross in the melting room. The amount added should not be enough to extinguish the reaction, but if it is progressing too vigorously, the addition may serve advantageously to lower the temperature of the hot mass.

To promote the exothermic reaction the dross should be placed in a container which is rotated or oscillated and which permits the dross to be kept in contact with an oxidizing atmosphere such as air. The axis of rotation may be horizontal, or at any angle to the horizontal, which will permit a rapid and effective tumbling or intermingling of the dross and any added flux and the heel of molten metal separated from the dross which quickly accumulates in the bottom of the container. We have discovered that the intermingling of the dross and separated metal in an inclined or horizontal rotating container while exposed to an oxidizing atmosphere creates the most satisfactory condition for consistently high metal recovery with the minimum of manual labor or discomfort to the operators. The rotational movement causes thorough intermingling and brings the dross into intimate contact with the heel of metal in the bottom of the container and thus insures maximum absorption of the metal globules in the dross by the heel. Instead of rotating the container through 360 degrees, it may be oscillated, but this movement must be sufficient to cause tumbling or intermingling of dross, any added flux, and metal as mentioned above. Since oscillation of this character may be considered to be partial rotation, the term rotation as employed in the claims below will be understood to include an oscillatory movement of the container. The rotation may be carried out in a partially closed cylindrical container, operated in a horizontal position or in a slightly inclined position as illustrated in the accompanying figures, or the container may be entirely open at one end and rest upon the other end which is closed, the container being supported on a cradle for tilting and provided with means for effecting rotation. The choice of a type of container, and its rotational position, will be determined by the particular requirements and equipment of the melting room where the process is carried out. Also, it is not necessary that the container be of cylindrical shape since polygonal shaped walls are equally satisfactory as far as tumbling is concerned, or the end or ends of the container may be of conical shape to facilitate mixing or discharge of the molten metal. The container must, of course, have an oxidizing atmosphere which will promote the exothermic reaction.

The speed of rotation or oscillation of the container is a matter of choice, depending upon the dross being treated, the size of the container and the progress of the exothermic reaction. The rotation should not be fast enough to cause separation of the metal from the dross through centrifugal effect; rather the rotation should be at such a speed as to produce a thorough intermingling or tumbling of dross, any added flux, and the heel of molten metal which accumulates in the bottom of the container and promote the exothermic reaction. We have found that rotational speeds of from 1 to 20 R. P. M. are quite satisfactory, those within the range of from 5 to 10 being preferred.

As mentioned hereinabove the exothermic reaction must occur in contact with an oxidizing atmosphere inasmuch as it depends on oxidation of metal particles in the dross. Ordinarily, the air or furnace atmosphere will supply sufficient oxygen for this purpose. In any event, the process cannot be successfully operated in an inert or reducing atmosphere which will not support the reaction. The exothermic reaction necessarily causes the oxidation of a portion of the aluminum in the dross. However, we have found that an increased recovery of metal is obtained by proper utilization of the heat of the reaction which more than compensates for loss of metal through oxidation. Although it is difficult to estimate the amount of metal consumed in this manner in any given instance, we have found that not more than about 20 per cent of the initial metal content of the dross is oxidized within the period allotted to the rotational operation. If larger losses occur, it is doubtful if the recovery process is economical. Also, if the reaction and rotation are carried far enough, nearly all of the entrapped metal will be consumed, even that which accumulates in the bottom of the container.

Immediately following each rotational operation, the accumulated metal should be discharged and the residue may or may not be dumped from the container, depending on its metal content. In this manner the highest metal recovery is obtained and the apparatus is made available for an additional charge of dross. The metal may be tapped from the bottom of the container, which is preferred, or the container may be tilted at a sufficient angle to permit the liquid material to run out. Pig mold, crucibles, or any other suitable or desired metal holding means can be provided to receive the discharge metal. The residue which is usually still burning, is preferably removed to another portion of the plant or may be carried to an outdoor dump.

Another factor which is essential to the successful operation of our process is the proper metal content of the dross. It has been found that if there is less than about 30 per cent of free or uncombined entrapped aluminum in the dross the exothermic reaction cannot be readily started, or too long a time is consumed in separating the metal from the dross to make the process economical. Once the reaction is well under way, the metal content of the dross can be easily reduced to less than 30%. It has been found that the metal content of the cold dross residue from our process is often only 5 to 10 per cent. On the other hand, if the initial free metal content of the dross is very high, for example over 80 per cent, it is desirable to first allow molten metal to gather in the bottom of the container used to transfer the dross to the rotating apparatus, or in the rotating container itself before rotation starts, and then drain the metal. If the high metal-containing dross is rotated it will be difficult, if not impossible, to stimulate the exothermic reaction, or if it has started it will soon die out. By reducing the metal content of the dross to below about 80 per cent, the reaction can be started and maintaintd. We have found, in general, that our process starts most efficiently on wet dross, but once the reaction has begun the process may be operated in cycles of rotation and metal draining, or the reaction can be allowed to continue without interruption until the metal content of the dross is less than 30 per cent. In referring to the metal content of the dross it is to be understood that this means the free metal and not that which is chemically combined.

To improve the recovery of metal end, more particularly to quickly start or hasten the exothermic reaction, certain types of fluxes may be added to the dross. Because of this behavior, the fluxes may be called igniting agents. Such fluxes may be of the volatile or the non-volatile type. Among the former group of fluxes are zinc and aluminum chlorides, while the latter group includes the fused salt variety, such as those in which alkali metal chlorides and fluorides predominate. We have found that those fluxes which contain fluorides are especially effective. Examples of suitable compositions in addition to aluminum and zinc chlorides are as follows:

85% NaCl—15% CaF$_2$
Cryolite
Na$_2$SiF$_6$

The quantity of the flux used will vary with the character of the dross and its treatment in the furnace. In many instances the salt may be thrown upon the dross in the furnace and thus start the reaction before the dross is raked from the furnace. Alternatively, the flux may be added to the dross in the rotating container. In general, the quantity of the flux should not exceed 5% of the weight of the dross, smaller amounts of less than 3% being preferred. The flux does not, under any conditions, form a separate liquid layer, but is completely intermingled with the dross.

The choice of the igniting flux will be determined in part by the temperature at which the exothermic reaction is to be started. This is of importance where cold dross is being heated or where the reaction has not yet started in the hot dross removed from the furnace.

Our process is applicable to the treatment of aluminum and all aluminum base alloys which produce a dross on contact with air. The various alloys differ in their susceptibility to oxidation by virtue of their composition. Those which contain magnesium are more readily oxidizable than those which do not have this element. As a result it has been found that the exothermic reaction may be started at somewhat lower temperature for the dross derived from certain alloys than that originating on melts of other compositions. The choice of the most desirable starting temperature, if lower than 850° C., and the period of rotation necessary to obtain the best results may be readily determined through a few simple tests.

Although it is generally most economical to treat the hot dross as it comes from the furnace, cold dross may be processed also. In the latter case, it is necessary to preheat the mass and bring the temperature up to that at which the reaction starts. The heated dross can then be handled in the same manner as that processed immediately upon removal from the furnace.

One form of apparatus adapted to carry out our process is illustrated in the accompanying figures. An alternative apparatus is described and claimed in copending application Serial No. 769,490, filed August 19, 1947. In the figures a cylindrical refractory lined drum 10 is provided with circular tracks 12 which travel on pairs of supporting and driving rolls 14 and 16. One pair of rolls, 14, mounted on a common shaft, are driven through a conventional gear reducer 20 and a motor 22. The drum and rollers are carried by framework 18, one set of rollers being higher than the other in order to give the drum an inclined position. The drum is charged through opening 26. In the opposite end of the drum is a small opening 28 through which can be inserted a portable gas burner 24. The gas burner is employed to dry and preheat the drum prior to the introduction of the dross. In Fig. 3 is shown a cross section of the drum holding a charge of molten metal 34 and dross 32. At the lowest end of the drum a tap hole 30 is provided which is closed with a fire clay plug 31. The plug is removed whenever the metal is to be discharged and replaced with a fresh one. Other conventional metal flow control means can, of course, be substituted for the plug.

In operation, the skim or dross raked from a furnace is directly transferred to the drum and rotation or oscillation is started. The rotation should be at such a rate as to thoroughly intermingle the dross and separated metal and to stimulate the exothermic reaction, this being at about 1 to 20 R. P. M. If the dross is burning when introduced to the drum, the period of 1 to 20 minutes for rotation can be calculated from the time when charging is complete, otherwise it is necessary to rotate the dross until the reaction has started and then begin counting the aforesaid allotted time for the reaction to progress. If the reaction has not started in the dross at the time it is introduced to the drum, it is helpful to introduce an igniting agent as has been described hereinabove. Upon completion of the rotational agitation of the charge the rotation is stopped, the tap hole is opened and the liquid allowed to drain. After discharge of the metal, the hole may be filled again for another period of operation. The dross residue should generally be removed from the drum before again charging it to accommodate the next batch of dross. By following this procedure average metal recoveries of 65 to 70 per cent have been obtained on many tons of dross collected from furnaces handling commercial aluminum base alloys. These values represent the amount of the original metal content of the dross which is recovered.

In place of continuous rotation or oscillation, this movement may be imparted for a period of 3 to 5 minutes, the movement stopped, the metal drained, and rotation started for another period of longer or shorter duration. This may be continued until the dross residue contains less than 30 per cent by weight of metal.

In operating the drum it is desirable to first dry and preheat it. This can be conveniently done by means of a gas burner as mentioned hereinabove. If cold dross is being processed it is preferable to preheat it elsewhere and perform only the reclaiming operation in the drum.

For successful operation it is necessary to maintain an oxidizing atmosphere within the drum during its period of operation. By providing a charging door or opening in the drum and keeping it open during the rotation thereof, enough air will be admitted to promote the exothermic reaction.

Having thus described our invention and certain embodiments thereof, we claim:

1. The method of reclaiming metallic values from aluminous dross containing at least 30 per cent by weight of free metal, said dross being at a temperature above the melting point of the metal, comprising draining any molten metal until the metal content of the dross is less than 80 per cent, inducing and maintaining an exothermic reaction in said dross under an oxidizing atmosphere and raising the temperature of the dross to at least 850° C., wherein a portion of said free metal is consumed, by rotating said dross on a horizontal or inclined axis, accumulating a body of molten metal underneath the mass of dross, intermingling the dross with said body of molten metal separated therefrom, and continuing said rotation until the metal content of the dross is less than 30 per cent and there-after discharging the molten metal separated from the dross.

2. The method of reclaiming metallic values from hot aluminous dross having a metal content of 30 to 80 per cent by weight in liquid form comprising inducing and maintaining an exothermic reaction in said dross under an oxidizing atmosphere and raising the temperature of the dross to at least 850° C., wherein a portion of said metal is consumed, by rotating said dross on a horizontal or inclined axis, accumulating a body of molten metal underneath the mass of dross, intermingling the dross with said body of molten metal separated therefrom, continuing said rotation for a total period of from 1 to 20 minutes after said reaction has started, and discharging the molten metal separated from the dross.

3. The method of reclaiming metallic values from hot aluminous dross having a metal content of 30 to 80 percent by weight in liquid form comprising inducing and maintaining an exothermic reaction in said dross under an oxidizing atmosphere and raising the temperature of the dross to at least 850° C., wherein a portion of said metal is consumed, by rotating said dross on a horizontal or inclined axis at a speed of 1 to 20 R. P. M., accumulating a body of molten metal underneath the mass of dross, intermingling the dross with said body of molten metal separated therefrom, continuing said rotation for a total period of from 1 to 20 minutes after said reaction has started, halting the rotational movement, and discharging the molten metal separated from the dross.

4. The method of reclaiming metallic values from burning aluminous dross having a metal content of 30 to 80 per cent by weight comprising promoting and maintaing the burning reaction under an oxidizing atmosphere by rotating said dross on a horizontal or inclined axis, accumulating a body of molten metal underneath the mass of dross, intermingling the dross with said body of molten metal separated therefrom, maintaining the burning reaction until less than 30 per cent metal remains in the dross, halting said rotational movement, and discharging the molten metal separated from the dross.

5. The method of reclaiming metallic values from aluminous dross having a free metal content of at least 30 per cent by weight in liquid form comprising adding to said dross up to 5 per cent by weight of a salt flux capable of stimulating an exothermic reaction between said dross and the air, introducing said dross and flux mixture to a confined zone having an oxidizing atmosphere in contact with said dross and wherein the dross is rotated, draining any accumulated molten metal until the metal content of the dross is less than 80 per cent, inducing and maintaining said exothermic reaction under an oxidizing atmosphere and raising the temperature of the dross to at least 850° C., wherein a portion of the free metal is consumed, by rotating said mixture on a horizontal or inclined axis, accumulating a body of molten metal underneath the mass of dross, intermingling said dross with said body of molten metal separated therefrom while retaining said mixture in said zone, continuing said rotation for a total period of 1 to 20 minutes after the reaction has begun, and discharging the molten metal separated from the dross.

6. The method of reclaiming metallic values from hot non-burning aluminous dross having a metallic content of 30 to 80 per cent by weight comprising introducing said dross to a confined zone having an oxidizing atmosphere therein and wherein the dross is rotated, adding up to 5 per cent by weight of flux with respect to the weight of the dross, said flux being capable of stimulating an exothermic reaction between said dross and the said atmosphere, inducing and maintaining said exothermic reaction and raising the temperature of said dross and flux mixture to at least 850° C., wherein at least a portion of the free metal is consumed, by rotating said dross and flux mixture at 1 to 20 R. P. M. on a horizontal or inclined axis, accumulating a body of molten metal underneath the mass of dross, intermingling said mixture with said body of molten metal separated therefrom, continuing said rotation for a total period of 1 to 20 minutes after the reaction has started, and discharging the molten metal separated from the dross.

7. The method of reclaiming metallic values from hot aluminous dross having a metal content of 30 to 80 per cent by weight in liquid form comprising introducing said dross to a confined zone having an oxidizing atmosphere therein, rotating said dross on a horizontal or inclined axis at 1 to 20 R. P. M. for a total period of 1 to 20 minutes to promote and maintain an exothermic reaction between said dross and the said atmosphere and raise the temperature of the dross to at least 850° C., accumulating a body of molten metal underneath the mass of dross, intermingling said dross with said body of metal separated therefrom, halting the rotational movement after but a portion of the total period has elapsed, discharging the molten metal separated from the dross, and repeating said cycle of rotation and discharge of molten metal until less than 30 per cent of metal remains in the dross residue.

8. The method of reclaiming metallic values from hot aluminous dross having a temperature above the melting point of the metal contained therein, said dross also having a metal content of over 80 per cent by weight, said method comprising causing the molten metal to accumulate in the lowermost portion of the body of said hot dross, draining said molten metal until the metal content of the dross is less than 80 per cent, inducing and maintaining an exothermic reaction in said dross under an oxidizing atmosphere and raising the temperature of the dross to at least 850° C., wherein a portion of said metal is consumed, by rotating the said dross on a horizontal or inclined axis, in a confined zone having an oxidizing atmosphere therein at such a speed as to intermingle the dross with accumulated molten metal separated therefrom, halting said rotational movement after but a portion of the total rotational period has elapsed, discharging the molten metal separated from the dross, and repeating said cycle of rotation and discharge until less than 30 per cent of metal remains in the dross residue.

9. The method of reclaiming metallic values from cold aluminous dross having a metal content of at least 30 per cent by weight comprising heating said dross in an oxidizing atmosphere to a temperature at which the metal melts, draining any molten metal until the metal content of the dross is less than 80 per cent, inducing and maintaining an exothermic reaction in said dross and raising the temperature to at least 850° C., wherein a portion of said metal is consumed, by rotating said heated dross on a horizontal or inclined axis in a confined zone having an oxidizing atmosphere therein at such a speed as to intermingle the dross with accumulated molten metal separated therefrom, continuing said rotational movement until the metal content of the dross becomes less than 30 per cent, and discharging the molten metal separated from the dross.

10. The method of reclaiming metallic values from cold aluminous dross having a metal content of at least 30 per cent by weight comprising heating said dross in an oxidizing atmosphere to a temperature above the melting point of the metal but below the temperature at which an exothermic reaction occurs between said dross and said atmosphere, draining any molten metal until the metal content of the dross is less than 80 per cent, adding up to 5 per cent by weight of a flux capable of stimulating said exothermic reaction, inducing and maintaining said exothermic reaction and raising the temperature of the dross and flux mixture to at least 850° C., wherein a portion of said metal is consumed, by rotating said dross and flux mixture on a horizontal or inclined axis at such a speed as to intermingle it with accumulated molten metal separated therefrom, and discharging the molten metal separated from the dross.

11. The method of reclaiming metallic values from hot aluminous dross comprising rotating dross having a metal content of at least 30 per cent by weight, said dross being at a temperature above the melting point of the metal, draining any accumulated molten metal until the metal content of the dross is less than 80 per cent, inducing and maintaining an exothermic reaction in said dross and raising the temperature of the dross to at least 850° C., wherein a portion of said metal is consumed, by rotating said dross on a horizontal or inclined axis in a confined zone having an oxidizing atmosphere therein at such a speed as to intermingle said dross with accumulated molten metal separated therefrom, adding cold dross in amounts insufficient to reduce the temperature of the hot dross below 850° C., and discharging the molten metal separated from the dross.

12. The method of reclaiming metallic values from aluminous dross containing from 30 to 80 per cent by weight of metal selected from the group consisting of hot, burning and cold dross, comprising raising the temperature of the dross to the level where an exothermic reaction occurs, promoting and maintaining said exothermic reaction in said dross in a confined zone under an oxidizing atmosphere and raising the temperature of the dross to at least 850° C., wherein a portion of said metal is consumed, by rotating said dross on a horizontal or inclined axis, accumulating a body of molten metal underneath the mass of dross, intermingling the dross with said body of molten metal separated therefrom while retaining said dross and body of molten metal in said zone, and discharging said molten metal separated from the dross.

WILLIAM B. HEILMAN.
HERBERT M. SHORT.

REFERENCES CITED

The following references are of record in the file of this patent:

UNITED STATES PATENTS

| Number | Name | Date |
|---|---|---|
| 1,366,398 | Lund | Jan. 25, 1921 |
| 1,615,009 | Frost | Jan. 18, 1927 |
| 1,630,361 | Stay et al. | May 31, 1927 |
| 1,729,631 | Stay | Oct. 1, 1929 |

FOREIGN PATENTS

| Number | Country | Date |
|---|---|---|
| 520,533 | Great Britain | Apr. 26, 1940 |